Figure 1:
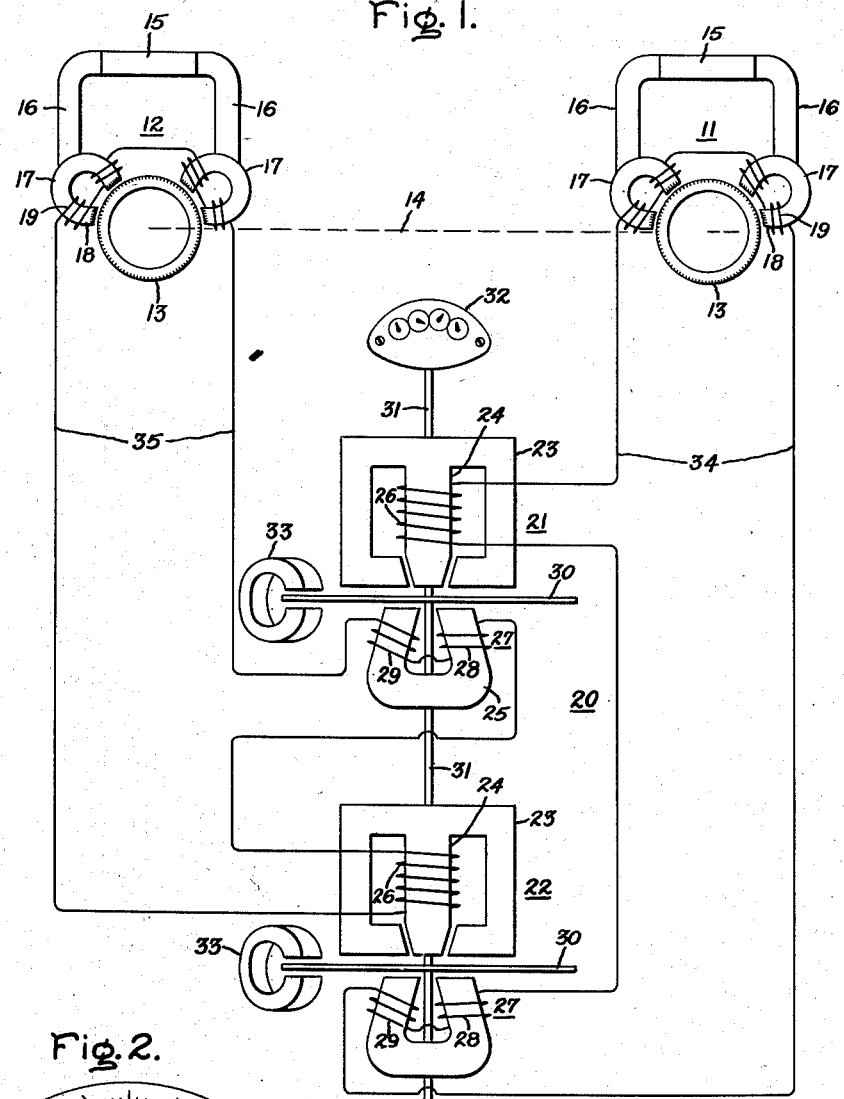

Feb. 18, 1941.  C. I. HALL ET AL  2,232,525
APPARATUS FOR MEASURING HORSEPOWER AND ENERGY
Filed March 30, 1940

Inventors:
Chester I. Hall,
Robert F. Edgar,
by Harry E. Dunham
Their Attorney.

Patented Feb. 18, 1941

2,232,525

UNITED STATES PATENT OFFICE 2,232,525

APPARATUS FOR MEASURING HORSEPOWER AND ENERGY

Chester I. Hall, Schenectady, and Robert F. Edgar, Pattersonville, N. Y., assignors to General Electric Company, a corporation of New York Application March 30, 1940, Serial No. 326,916

5 Claims. (Cl. 265—26)

This invention relates to apparatus for measuring the horsepower and energy transmitted by a mechanical shaft and more particularly to apparatus which may be used in connection with two alternators which are axially displaced on a shaft for measuring variations in the power delivered by the shaft.

In the measurement of the torque, horsepower, and horsepower hours transmitted by a mechanical shaft, it is known to employ two similar alternating current generators having their rotors mounted on and axially displaced along the shaft to obtain electrical variations in accordance with the torque and speed of the rotating shaft. In making such measurements, as the speed of the shaft varies the frequency of the output voltages of the two generators varies in a corresponding manner so that if the measuring circuit connected to the two generators does not have the same power factor with respect to each generator, the generators will be unequally loaded thereby causing errors in the measurement results and affecting the indication of other measuring instruments which may be connected to the generators.

It is an object of our invention to provide new and improved apparatus for measuring the horsepower and horsepower hours transmitted by a rotating member.

It is another object of our invention to provide a transmission dynamometer including two alternating current generators with an improved measuring instrument which maintains a similar and substantially constant current in each of the generator output circuits irrespective of the speed or frequency at which the generators are operated.

It is a further object of our invention to provide a relatively simple and accurate device for measuring the horsepower and horsepower hours transmitted by a rotating mechanical shaft.

In carrying our invention into effect in its preferred form, we employ in connection with the aforesaid alternating current generators a measuring instrument of the polyphase induction type having two bipolar induction elements with one flux producing winding of the first element connected in circuit with the opposite flux producing winding of the other element to one of the generators and the other flux producing winding of the first element connected in circuit with the remaining flux producing winding of the second element to the other generator. The load thus imposed on the generators is highly reactive so that the current flowing in the output circuits remains substantially independent of frequency variations and by virtue of the foregoing connection arrangement, the generators are loaded equally regardless of frequency variations. By providing damping magnets for the rotating disk means of the induction measuring device and by providing a totalizing element operated by the meter shaft it may be made to integrate the horsepower transmitted by the shaft over a period of time to provide a reading in terms of horsepower hours. Or, if desired, the damping magnets and the totalizing element may be dispensed with and, by providing the measuring device with a control spring, a pointer and a scale, it may be made to indicate the horsepower transmitted by the shaft.

Figure 2:
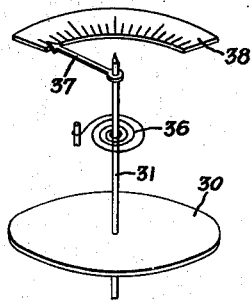

The novel features which are characteristic of our invention are set forth with particularity in the appended claims. Our invention, however, both as to its organization and its method of operation will be better understood from reference to the following description when considered in connection with the accompanying drawing in which Fig. 1 shows apparatus arranged in accordance with our invention for measuring the horsepower hours transmitted by a rotating shaft; and Fig. 2 shows a modification for measuring horsepower.

In a copending application of Alfred V. Mershon, Serial No. 297,313, filed September 30, 1939, entitled "Transmission dynamometer," there is disclosed and claimed a transmission dynamometer comprising two alternating current generators having their rotor elements secured to and axially spaced on a rotary shaft employed for transmitting power from a prime mover to a load. Such an arrangement may conveniently be employed in connection with the present invention. Referring to the drawing, I have shown a pair of inductor type alternators 11 and 12 each having rotor elements 13 with teeth of magnetic material, the rotary elements being mounted on and axially spaced along a rotary shaft having a center 14, which shaft is employed for transmitting mechanical power. Positioned adjacent each of the rotor elements 13 is a stator element comprising a field producing member 15 in the form of a permanent magnet and a pair of yokes or flux carrying members 16 of magnetic material, such as soft iron, which terminate in substantially horseshoe-shaped magnetic pole pieces 17 having teeth at their polar surfaces and positioned opposite and in cooperating relation with the teeth on the rotor element. Positioned on each of the legs 18 of the pole pieces 17 is a winding section 19 having a plurality of turns, the winding sections being connected in series circuit relation so that their voltages are additive. It will be appreciated that with this arrangement as the rotor element 13 rotates relative to the pole pieces 17 the reluctance of the magnetic circuit changes to cause variations in the magnetic flux in the legs 18 resulting in an alternating current voltage being induced in each of the windings 19.

It will be appreciated that, if the generated voltages of the two alternators 11 and 12 are initially adjusted to an in-phase or 180° out-of-phase relation for the no load condition of the shaft, when mechanical power is transmitted by the shaft a torsional twist takes place in the shaft causing a relative displacement between the voltages generated by the alternators which varies in accordance with the torque. It will be further appreciated that the magnitude of each of the generated voltages as well as its frequency varies in accordance with the speed of rotation of the shaft. The horsepower transmitted by the shaft, as will be understood by those skilled in the art, is proportional to the product of the speed or frequency times the phase displacement between the voltages generated by the two alternators. This fundamental relation we employ in carrying out the principle of our invention.

Referring more in detail to the drawing, in the illustrated embodiment we have shown a measuring device 20 similar to a polyphase watthour meter of the induction type having two bipolar induction elements 21 and 22. Each of the induction elements which may be of conventional form comprises a magnetic member 23 having a central leg 24 and a second magnetic member 25 of substantially horseshoe shape. Positioned about the central core 24 is a current conducting winding 26 composed of a comparatively large number of turns thereby giving it a high inductance. Positioned about the other magnetic member 25 is a winding 27 having a section 28 wound on one leg and a section 29 on the other leg with the portions connected in series circuit relation to magnetize the magnetic member 25 in the same direction. The induction elements 21 and 22 cooperate with current conducting disk means which in the illustrated embodiment comprises a pair of disks 30 and the disk means, which may be composed of a suitable material such as aluminum, is mounted on a vertical spindle or shaft 31 and a portion of the disk means passes through the air gap formed between the magnetic members 23 and 25. A totalizing device 32 operated by the shaft 31 records the total revolutions of the disk means 30. In the illustrated embodiment is also provided a damping magnet 33 positioned about each disk 30 to introduce a controlling torque for regulating the speed of rotation of the disk 30 in accordance with the rate at which power is transmitted by the mechanical shaft under observation.

We connect the coil 26 of the induction element 21 in series circuit relation with the coil 27 of the induction element 22 across the output terminals 34 of one of the alternators such as the alternator 11. In a similar manner we connect the coil 26 of the induction element 22 in series circuit relation with the coil 27 of the induction element 21 across the output terminals 35 of the other alternator.

It will be observed that the coil 26 of the lower element 22 is oppositely wound on its core 24 with respect to the corresponding coil 26 of the upper element on its core 24. Obviously, the same effect may be produced by reversing the electrical connections to the coil 26 of the lower element. It will thus be appreciated that, with this arrangement, if the currents in the circuits 34 and 35 are in phase the flux produced at any instant in the central leg 24 of the upper magnetic element 23 will be opposite in direction from that produced in the central leg of the lower element 23. We wish to point out also that the desired results may be obtained by reversing either the connections to or the winding direction of any one of the four coils. The important point is that the fluxes produced in the upper and lower central legs 24 should be 180 electrical degrees apart in time phase when the currents flowing in the circuits 34 and 35 are in phase or, alternatively, the fluxes in the respective upper and lower magnetic elements 25 should be displaced 180 electrical degrees for the in-phase condition of the two currents.

It should be stated that the coils 26 are wound with a suitable number of turns sufficient when related to the particular alternators employed to provide the desired flux in the disk means 30 without overloading the alternators. By virtue of the shape of the magnetic cores 25 on which the coils 27 are wound, it will be appreciated that the same number of turns in these coils will result in a considerably lower inductance than that of the coils 26. While we do not intend to limit our invention to a particular design for the respective coils, we have found that under a given set of conditions satisfactory results may be obtained by employing approximately 1100 turns in the coil 26 and from 700–1000 turns in each section of the coil 27. However, other alternator arrangements and meters having other types of magnetic circuits may dictate other constants for these coils.

With the foregoing arrangement, inasmuch as the circuits connected to each of the generators are predominantly inductive, the current flowing in the coils 26 and 27 and, hence the flux produced by them, will be substantially independent of speed changes in the shaft under observation, since the voltage generated by the alternators and the reactance of the coils are both proportional to the frequency. Thus, both alternators are loaded equally and the current in each generator circuit remains substantially constant irrespective of speed variations in the shaft 14 under observation.

It is well understood that the torque of a bipolar induction instrument of the foregoing character is due to the reaction in the disk between the alternating flux from one electromagnet with the eddy currents resulting from the flux alternations of the other electromagnet and vice versa. This torque which tends to produce rotation of each of the disks 30 is approximately proportional to the product of the frequency times each of the fluxes produced by the coils 26 and 27 times the sine of the angle of phase difference between these fluxes. Since the fluxes will be approximately constant in magnitude over the frequency range to be encountered, as already explained, the torque on each of the disks 30 is thus proportional to the product of the frequency times the sine of the angle of phase displacement between the two fluxes. Inasmuch as the sine function of an angle approaches a straight line for small values of the angle, the sine function may be considered as proportional to the angle itself so that the torque exerted on each of the disks 30 then may be considered as being proportional to the product of the frequency times the angle of phase displacement between the fluxes in the coils 26 and 27. This it will be observed is likewise proportional to the horsepower transmitted by the shaft 14.

If the magnetic circuits linking the coils 26 and 27 were symmetrical and if there were no inductance in the path of the eddy currents produced in the disk 30, there would be no torque produced by either element 21 or 22 tending to rotate its respective disk when the currents in the coils 26 and 27 are in phase. But because of the presence of inductance to a certain extent in the eddy current path of each disk there results a slight phase displacement between the eddy currents produced in the disk and the fluxes which cause them. As a result of this factor and the unsymmetrical arrangement of the two magnetic circuits 23 and 25, there is a slight torque tending to rotate the disk means even when the currents in each of the coils 26 and 27 are in phase. However, since one of the coils of one meter element will produce a flux which is 180 degrees out of phase with the flux produced by the corresponding coil of the other meter element for the condition when their currents are in phase, it will be obvious that for this condition, these "residual" torques are balanced out since the torques exerted on the disk means by the two induction elements will be in relatively opposite directions.

We make use of this relation for adjusting the phase relations of the output voltages of the two generators to make the disk means operate at zero speed for the condition of no load on the mechanical shaft under observation. As load is applied to the shaft under observation, the voltages generated by the alternators 11 and 12 will be displaced in phase due to the twist in the shaft so that the currents flowing in the coils 26 and 27 become displaced in phase resulting in corresponding time-phase displacement of the respective magnetic fluxes. With the coils properly connected, as illustrated for example, a driving torque is produced on each of the disks in the same direction for the condition when the currents in the two coils of each element are displaced in phase due to the twist in the shaft under observation, and the "residual" torques are balanced out for all conditions of phase displacement to which the device is subjected. Thus as torque is transmitted through the shaft under observation, a torque is exerted on each of the disks 30 in the same direction causing them to rotate and operate the totalizing device 32. The induction measuring device 20 may be calibrated by displacing the voltages of the alternators a given amount corresponding to a known amount of power being delivered by the shaft under observation and adjusting the position of each damping magnet 33 about the disk means 30 until the totalizing device 32 registers at a rate corresponding to the power transmitted.

In Fig. 2 I have shown a modification adapted for measuring horsepower. In this arrangement the drag magnets 33 of Fig. 1 are removed and the rotation of the disk means 30 and spindle 31 is controlled by a spring 36 as in an ordinary wattmeter. Also, the totalizing device 32 is replaced by a pointer 37 and a cooperating scale 38. With this arrangement including a properly calibrated scale, the indications will be proportional to the horsepower transmitted by the shaft 14.

According to the present invention, both of the alternators being loaded on electrical circuits of similar characteristics, the load on each will be the same at all times and they will maintain the same relative terminal voltages throughout the operating range. Furthermore, the current flowing in each generator output circuit remains substantially constant. The accuracy of measurement is improved and the induction measuring device 20 will not interfere with other measuring instruments which may be connected in circuit with the alternators.

In accordance with the provisions of the patent statutes, we have described the principle of operation of our invention together with the apparatus which we now consider to represent the best embodiment thereof, but we desire to have it understood that the apparatus shown is only illustrative and that modifications and variations may be employed in carrying out the invention, for example, a polyphase instrument may be of the single disk type which is well known in the art. We aim therefore to cover all such modifications and variations as fall within the scope of our invention which is defined in the appended claims.

What we claim as new and desire to secure by Letters Patent of the United States is:

1. In combination, a plurality of alternating current generators having their rotors secured to and axially displaced on a shaft adapted to transmit mechanical power, a measuring device comprising two induction elements each cooperating with a rotary element and said rotary elements being secured to a common spindle, each of said induction elements comprising a first coil and a second coil for producing magnetic fluxes, means connecting the first coil of one of said induction elements in circuit with the second coil of the other induction element to the output of one of said generators, means connecting the second coil of said one induction element in circuit with the first coil of said other induction element to the output of the other generator, and means responsive to the rotary movement of said rotary elements.

2. In combination, a plurality of alternating current generators having their rotors secured to and axially displaced on a shaft adapted to transmit mechanical power, a measuring device comprising two bipolar induction elements cooperating with rotatably mounted current conducting disk means, each of said induction elements comprising a first coil and a second coil for producing magnetic fluxes, means connecting the first coil of one of said induction elements in circuit with the second coil of the other induction element to the output of one of said generators, means connecting the second coil of said one induction element in circuit with the first coil of said other induction element to the output of the other generator, one of the coils of one of said elements being so arranged in its respective circuit as to produce a flux in its magnetic circuit which is opposite in direction from the flux produced by the corresponding coil of the other induction element in its respective magnetic circuit when the currents in said coils are in phase, and means responsive to the rotary movement of said disk means.

3. In a device for obtaining a measurement proportional to the torsional deflection of a shaft adapted to transmit mechanical power, a pair of alternators having their rotor elements secured to and positioned in spaced relation on said shaft, a measuring device comprising two bipolar induction elements cooperating with current conducting disk means secured to a rotatable spindle, each of said induction elements comprising a first coil and a second coil, means connecting the first coil of one of said induction elements in series circuit relation with the second coil of the other element to the output terminals of one of said alternators, means connecting the second coil of said one induction element in series circuit relation with the first coil of said other induction element to the output terminals of the other alternator, means for controlling the rate of rotational movement of said disk means, and means for totalizing the revolutions of said spindle in terms of horsepower hours.

4. In combination in a device for measuring the power transmitted by a mechanical shaft, a pair of alternating current generators including cooperating rotor and stator elements, said rotor elements being secured to said shaft in axially spaced relation and adapted to rotate therewith, a measuring instrument comprising a pair of bipolar induction elements each cooperating with a current conducting disk and each comprising a first and second current coil for producing magnetic fluxes which link said disk, said measuring instrument further comprising an operating spindle, means securing each of said disks to said spindle, means connecting the first coil of one of said induction elements in circuit with the second coil of the other of said induction elements to the output terminals of one of said generators, means connecting the first coil of the other of said induction elements in circuit with the second coil of said one induction element to the output terminals of the other of said generators, a resilient control member for producing a force in opposition to the torque tending to produce rotation of said disks, and means for indicating the angular movement of said spindle in proportion to the power transmitted by said mechanical shaft.

5. In combination in a system comprising a pair of alternating current generators including cooperating rotor and stator elements and having said rotor elements mounted in axially spaced relation to rotate with a shaft adapted to transmit mechanical power, a measuring device comprising two similar bipolar induction elements cooperating with rotatably mounted current conducting disk means, said disk means being secured to an operating spindle, each of said induction elements comprising similar first and similar second coils for producing magnetic fluxes in said disk means, means connecting the first coil of one induction element in series circuit relation with the second coil of the other induction element and across the output terminals of one of said generators, means connecting the first coil of said other induction element in series circuit relation with the second coil of said one induction element and across the output terminals of the other of said generators, each of said circuits being predominantly inductive in character so that the magnitude of currents flowing therein will be substantially independent of the speed of rotation of said power transmitting shaft, and means responsive to the rotary movement of said operating spindle.

CHESTER I. HALL.
ROBERT F. EDGAR.